United States Patent
Kang et al.

(10) Patent No.: US 9,002,353 B2
(45) Date of Patent: Apr. 7, 2015

(54) APPARATUS AND METHOD OF CALCULATING AVAILABLE CHANNELS CONSIDERING PRIORITY IN TVWS

(71) Applicant: Electronics and Telecommunications Research Institute, Daejeon (KR)

(72) Inventors: Kyu Min Kang, Daejeon (KR); Sang In Cho, Daejeon (KR); Jae Cheol Park, Gyeonggi-do (KR); Byung Jang Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 28 days.

(21) Appl. No.: 13/898,863

(22) Filed: May 21, 2013

(65) Prior Publication Data
US 2014/0171072 A1    Jun. 19, 2014

(30) Foreign Application Priority Data
Dec. 17, 2012    (KR) .......................... 10-2012-0147549

(51) Int. Cl.
H04W 48/16    (2009.01)
(52) U.S. Cl.
CPC .................................... *H04W 48/16* (2013.01)
(58) Field of Classification Search
USPC ................. 455/434, 452.1, 501, 512
See application file for complete search history.

(56) References Cited

U.S. PATENT DOCUMENTS 7,528,751 B2    5/2009    Park et al.
2014/0018114 A1*    1/2014    Jo et al. .......................... 455/501

FOREIGN PATENT DOCUMENTS

| KR | 10-0835077 | 6/2008 |
| KR | 10-2010-0060683 | 6/2010 |
| KR | 10-2013-0068222 | 6/2013 |

OTHER PUBLICATIONS

Jeon, H.S. et al., "MIH Based Broadcast and Mobile Convergence Service Standardization," Electronics and Telecommunications Trends, vol. 25(1):114-123 (2010).

* cited by examiner

*Primary Examiner* — Sam Bhattacharya
(74) *Attorney, Agent, or Firm* — Nelson Mullins Riley & Scarborough LLP

(57) ABSTRACT

Disclosed are an apparatus and a method of calculating available channels considering a priority in a TVWS. An apparatus for calculating available channels considering a priority in a TVWS according to the present invention includes: a communication module configured to receive a request for information on usable available channels from a TV Band Device (TVBD); an available channel calculation unit configured to calculate one or more available channels usable by the TVBD based on one or more predetermined reference parameters according to the request; a priority assignment unit configured to assign a priority to each of the calculated available channels, generate an available channel list including the available channels to which the priorities are assigned, and provide the TVBD with the generated available channel list; and a database configured to store the available channels, to which the priorities are assigned, calculated for each TVBD.

12 Claims, 7 Drawing Sheets

APPARATUS AND METHOD OF CALCULATING AVAILABLE CHANNELS CONSIDERING PRIORITY IN TVWS

CROSS-REFERENCE TO RELATED APPLICATIONS

This application claims priority to and the benefit of Korean Patent Application No. 10-2012-0147549 filed in the Korean Intellectual Property Office on Dec. 17, 2012, the entire contents of which are incorporated herein by reference.

TECHNICAL FIELD

The present invention relates to an available channel calculating method, and more particularly, to an apparatus and a method of calculating available channels considering a priority in a TVWS, which selects one or more available channels at a location which a TVBD desires to operate and provides the selected available channels, in which a predetermined priority for each region of each TVBD network is assigned to each of one or more available channels so that an available channel list to which priorities are assigned is provided.

BACKGROUND ART

Recently, A non-licensed usage for a TV frequency band that is not used and is vacant, which is called TVWS, is allowed by the Federal Communications Commission (FCC), and as a result, researches on a spectrum sharing technology in the frequency band have been actively conducted internationally. In the IEEE, various working groups, such as IEEE 802.22, 802.11af, and 802.15.4, have completed or are advancing a TVBD or TVBD network self standard. IEEE 802.00 has newly established 802.22 WG at the same pace with a TVWS usage plan by the FCC in November 2004, and completed the physical layer (PHY)/media access control (MAC) standard for a wireless regional area network (WRAN) that is a TV band fixed wireless communication network using the CR technology in 2011.

IEEE 802.19.1 is advancing standard work for an independently applicable TVWS frequency sharing method, without dependence on a radio technology between heterogeneous or independently operated TVBD networks or heterogeneous TVBDs. In order to efficiently use the TVWS and maximize efficiency of limited frequency resources internationally, the establishment of a TVWS usage technology standard has been spurred at a national level.

In order to operate a TVBD network by using the TVWS that is a frequency band which is not used for each region in a specific time within a TV band and is vacant, a top priority is not to exert an interference influence on existing first services operated in a neighboring area. To this end, the TVBD network is operated, by using a usable frequency band (available channel list, hereinafter, an available channel) received from a TVWS database, at a point spaced apart by a predetermined distance (keep-out distance, hereinafter, a protection spaced distance) from a service boundary point of an existing service operated within the TV band. When the TVBD is operated while including the protection spaced distance from a service boundary point of a first user, the first user may smoothly operate the service without being influenced from the TVBD, but the TVBD network may have a reduced service radius due to an interference influence of the first user.

In the related art, when the TVBD desired to use the TVWS notifies the TVWS database of related information, such as location information, a type, and a height of a transmission antenna, of the TVBD through WiFi or an existing network and requests available channel information to the TVWS database, the TVWS database calculates a usable channel at a location which the TVBD desires to currently operate by using information on the first user, location information on the corresponding TVBD, the type of the TVBD, the height of the transmission antenna, a protection spaced distance according to the height of the TVBD transmission antenna, and the like. In this case, the existing TVWS database transmits a calculation result of the available channels usable by the corresponding TVBD to the TVBD without a priority, and the TVBD selects one or multiple channels in the available channel list to operate the TVBD service.

However, when the TVWS database calculates the available channels according to the method in the related art, a service radius of the TVBD network may be decreased due to an influence of the first service operated in an adjacent region.

SUMMARY OF THE INVENTION

The present invention has been made in an effort to provide an apparatus and a method of calculating available channels considering a priority in a TVWS, which selects one or more available channels at a location which a TVBD desires to operate and provides the selected available channels, in which a predetermined priority for each region of each TVBD network is assigned to each of one or more available channels so that an available channel list, to which priorities are assigned, is provided.

However, an object of the present invention is not limited to the aforementioned matters, and those skilled in the art will clearly understand non-mentioned other objects through the following description.

An exemplary embodiment of the present invention provides an apparatus for calculating available channels considering a priority in a TVWS, including: a communication module configured to receive a request for information on usable available channels from a TV Band Device (TVBD); an available channel calculation unit configured to calculate one or more available channels usable by the TVBD based on one or more predetermined reference parameters according to the request; a priority assignment unit configured to assign a priority to each of the calculated available channels, generate an available channel list including the available channels to which the priorities are assigned, and provide the TVBD with the generated available channel list; and a database configured to store the available channels, to which the priorities are assigned, calculated for each TVBD.

The reference parameter may include at least one of information on a first user, information on a location of the TVBD, a type of the TVBD, a height of a transmission antenna of the TVBD, and a protection spaced distance according to the height of the transmission antenna of the TVBD.

The priority assignment unit may assign a priority predetermined according to a region in which the TVBD is located to each of the calculated available channels to generate an available channel list including one ore more available channels to which the priorities are assigned, and provide the TVBD requesting the information on the available channels with the generated available channel list.

A region outside a radius of a DTV service for protecting the DTV service may be divided into a plurality of regions with a predetermined interval, so that the priority may be differently determined for each of the plurality of divided regions.

The apparatus may further include: a region dividing unit configured to divide a region outside a radius of a DTV service for protecting the DTV service into a plurality of regions with a predetermined interval; and a level determination unit configured to determine a priority for each of the plurality of divided regions.

The region dividing unit may detect strength of a radio wave signal received from the TVBD to predict radio wave path loss to a corresponding region based on the strength of the detected radio wave signal, and divide the region outside the radius of the DTV service for protecting the DTV service into the plurality of regions with the predetermined interval based on the predicted radio wave path loss.

The region dividing unit may divide the region outside the radius of the DTV service for protecting the DTV service into the plurality of regions with the predetermined interval from a point spaced by the protection spaced distance.

Another exemplary embodiment of the present invention provides a method of calculating available channels considering a priority in a TVWS, including: receiving a request for information on usable available channels from a TV Band Device (TVBD); calculating one or more available channels usable by the TVBD based on one or more predetermined reference parameters according to the request; assigning a priority to each of the calculated available channels, generating an available channel list including the available channels to which the priorities are assigned, and providing the TVBD with the generated available channel list; and storing the available channels, to which the priorities are assigned, calculated for each TVBD.

The reference parameter may include at least one of information on a first user, information on a location of the TVBD, a type of the TVBD, a height of a transmission antenna of the TVBD, and a protection spaced distance according to the height of the transmission antenna of the TVBD.

The providing may include assigning a priority predetermined according to a region, in which the TVBD is located, to each of the calculated available channels to generate an available channel list including one ore more available channels to which the priorities are assigned, and providing the TVBD requesting the information on the available channels with the generated available channel list A region outside a radius of a DTV service for protecting the DTV service may be divided into a plurality of regions with a predetermined interval, so that the priority may be differently determined for each of the plurality of divided regions.

The method may further include: dividing a region outside a radius of a DTV service for protecting the DTV service into a plurality of regions with a predetermined interval; and determining a priority for each of the plurality of divided regions.

The dividing may include detecting strength of a radio wave signal received from the TVBD to predict radio wave path loss to a corresponding region based on the strength of the detected radio wave signal, and dividing the region outside the radius of the DTV service for protecting the DTV service into the plurality of regions with the predetermined interval based on the predicted radio wave path loss.

The dividing may include dividing the region outside the radius of the DTV service for protecting the DTV service into the plurality of regions with the predetermined interval from a point spaced by the protection spaced distance.

According to the exemplary embodiments of the present invention, it is possible to select one or more available channels at a location which a TVBD desires to operate and provide the selected available channels, in which a predetermined priority for each region of each TVBD network is assigned to each of one or more available channels so that an available channel list, to which priorities are assigned, is provided, thereby achieving an effect of improving efficiency of use of the TVWS by allowing the TVBD to use the channel from the channel having a high priority.

According to the exemplary embodiment of the present invention, it is possible to improve efficiency of use of the TVWS by allowing the TVBD to use the channel from the channel having a high priority, thereby achieving an effect of improving a capacity of entire channels of the TVBD network.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
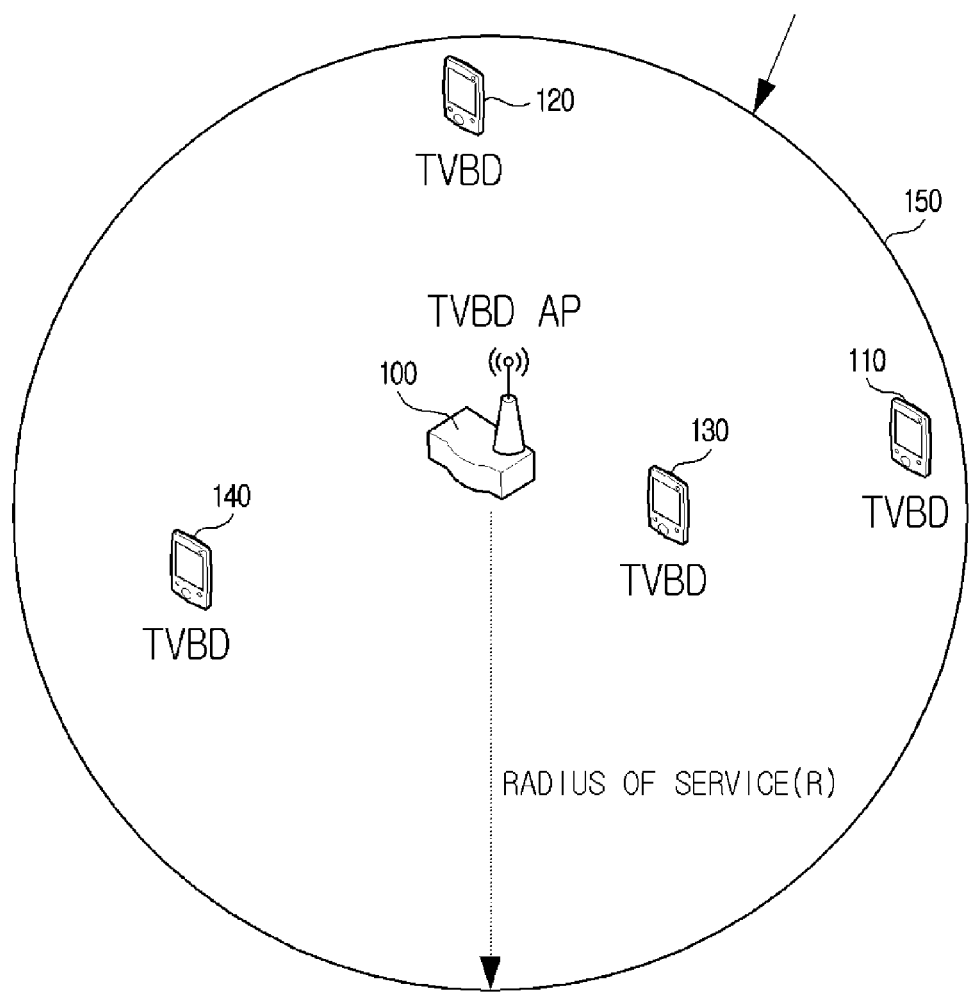
FIG. 1 is a diagram illustrating a service radius of a TVBD network in a situation having no service interference.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus and a method of calculating available channels considering a priority in a TVWS according to an exemplary embodiment of the present invention will be described with reference to FIGS. 1 to 7. The present invention will be described in detail based on parts necessary to understand an operation and an effect according to the present invention.

In describing constituent elements of the present invention, different reference numbers may refer to like elements depending on the drawing, and like reference numerals may refer to like elements even though like elements are shown in different drawings. However, even in this case, it is not meant that a corresponding constituent element has a different function according to an exemplary embodiment or has the same function in different exemplary embodiments, and a function of each constituent element may be determined based on a description of each constituent element in a corresponding exemplary embodiment.

Especially, the present invention suggests a new method of selecting one or more available channels at a location which a TV band device (TVBD) desires to operate and providing a list of the selected available channels, in which a predetermined priority for each region of each TVBD network is assigned to each of one or more available channels so that an available channel list to which priorities are assigned is provided.

FIG. 1 is a diagram illustrating a service radius of a TVBD network in a situation having no service interference.

As illustrated in FIG. 1, it is assumed that a TVBD network provides a service by using a channel N. When a DTV transmission station using the channel N around a TVBD AP 100 is sufficiently spaced apart from a TVBD service region 150, so that all TVBDs 110, 120, 130, and 140 within the TVBD service region do not receive an interference influence from a DTV service, a radius R of the TVBD service may be determined by white noise or TVBD reception performance in the corresponding channel N.

All of the TVBDs 110, 120, 130, and 140 located within the TVBD service region 150 having the determined radius R of the TVBD service may freely receive the TVBD service.

Figure 2:
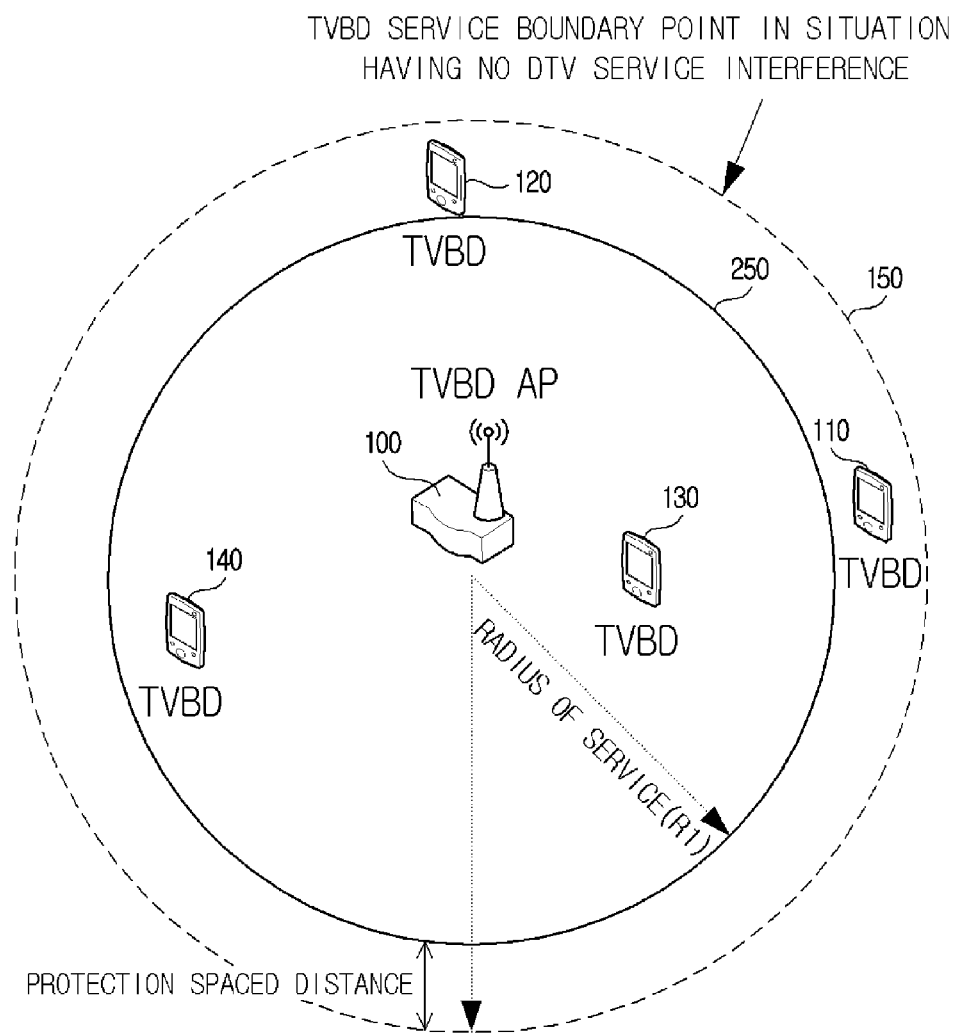
FIG. 2 is a diagram illustrating a service radius of a TVBD network in a situation having a DTV service interference.

FIG. 2 is a diagram illustrating a service radius of the TVBD network in a situation having a DTV service interference.

As illustrated in FIG. 2, it is assumed that the TVBD network provides a service by using a channel N. When the DTV transmission station using the channel N around the TVBD AP 100 is not sufficiently spaced apart from the TVBD service region 150, so that the TVBD receives an interference influence from a DTV signal, a radius R1 of the TVBD service may be determined by interference of the DTV signal, as well as white noise or TVBD reception performance, in the corresponding channel N.

It is a matter of course that the TVBD maintains a protection spaced distance from a DTV service boundary point even in this case.

Compared to the service radius of the TVBD of FIG. 1, the service radius of the TVBD is decreased from the radius R to the radius R1 due to the interference influence of the DTV signal. Accordingly, the TVBDs 130 and 140 may freely receive the TVBD service within the TVBD service boundary point, but the TVBDs 110 and 120 may not receive the TVBD service outside the TVBD service boundary point.

Figure 3:
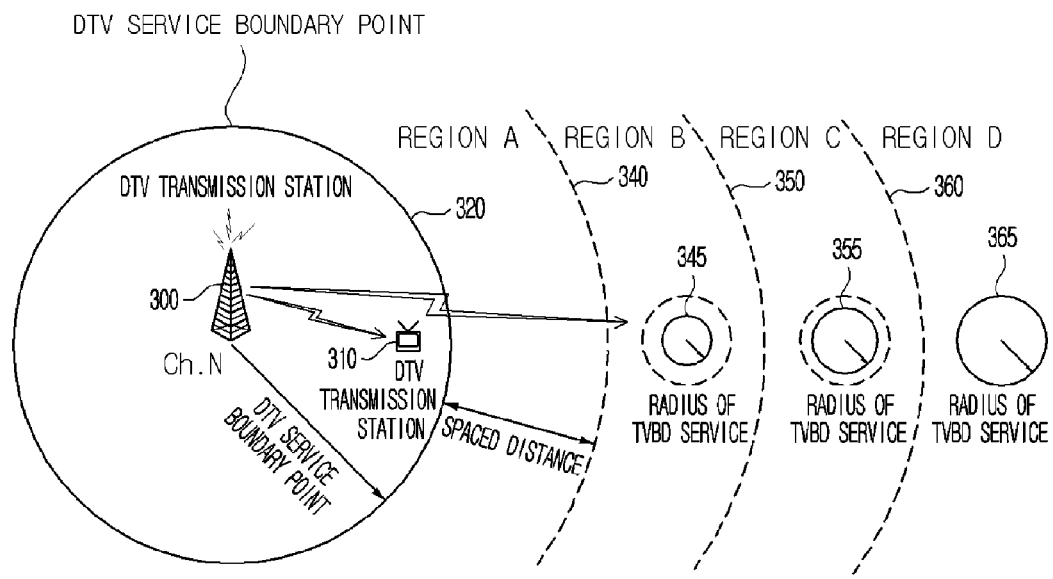
FIG. 3 is a diagram illustrating a service radius for each region of a TVBD network according to a DTV service interference.

FIG. 3 is a diagram illustrating a service radius for each region of the TVBD network according to a DTV service interference.

As illustrated in FIG. 3, a region outside the DTV service boundary point is generally divided into four regions (a region A, a region B, a region C, and a region D) for description. A DTV receiver 310 is designed so as to receive a signal from a point at which reception signal strength of a broadcasting signal transmitted from a DTV transmission station 300 by using the channel N is at least 41 dBuV/m, and the DTV receiver is located within a DTV service radius 320, in which the reception signal strength is equal to or larger than 41 dBuV/m, to receive the broadcasting signal of the corresponding channel.

In order for the DTV receiver 310 within a DTV service radius 330 to clearly receive the broadcasting signal, a desired-to-undesired signal power (D/U) ratio needs to be satisfied.

When TVBDs 345, 355, and 365 desire to operate the corresponding TVBD by using the same channel as that used by the DTV, that is, the channel N, or an adjacent channel, that is, a channel N−1 or a channel N+1, in an adjacent region in which the DTV service is provided, it is necessary to maintain a sufficient distance from all DTV receivers within the DTV service radius to the extent that the D/U ratio is satisfied, in which the distance is referred to as a protection spaced distance for protecting the DTV service.

Accordingly, when the TVBD network is operated in the region B, the region C, and the region D, except for the region A, outside the radius of the DTV service, the DTV receiver may clearly receive the broadcasting signal without interference influence from the TVBD. However, the DTV signal transmitted from the DTV transmission station causes interference influence to the TVBD network located in the region B and the region C, so that the radius of the TVBD service is decreased.

For example, since the strength of the DTV signal is decreased as being close to the region B, the region C, and the region D, the radius of the TVBD service is relatively increased as being close to the region B, the region C, and the region D.

Figure 4:
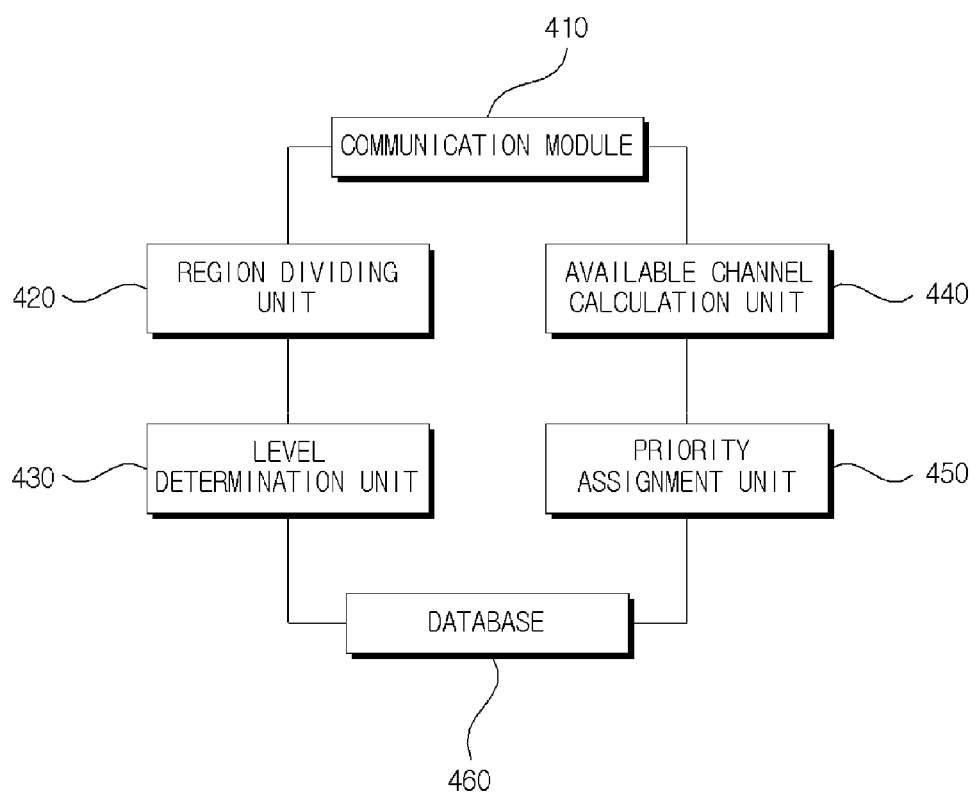
FIG. 4 is a diagram illustrating an apparatus for selecting available channels according to an exemplary embodiment of the present invention.

FIG. 4 is a diagram illustrating an apparatus for selecting available channels according to an exemplary embodiment of the present invention.

As illustrated in FIG. 4, the apparatus for selecting the available channels according to the present invention may include a communication module 410, a region dividing unit 420, a level determination unit 430, an available channel calculation unit 440, a priority assignment unit 450, and a database 460. The apparatus for selecting the available channels refers to a TVWS DB or a TV band DB.

The communication module 410 may transmit/receive various data in association with the TVBD. For example, the communication module 410 may transmit an available channel list to which priorities are assigned to a corresponding TVBD.

The region dividing unit 420 may divide a region outside the radius of the DTV service for protection of the DTV service into a plurality of regions. In this case, the region dividing unit 420 may divide the region into a plurality of regions by considering an actual neighboring environment, such as radio wave environment information for each region or radio wave signal strength.

For example, the region dividing unit 420 may detect strength of a radio wave signal received from the TVBD and predict radio wave path loss to a corresponding region based on the detected strength of the radio wave signal, and divide a region outside the radius of the DTV service into a plurality of regions based on the predicted radio wave path loss.

In this case, the region dividing unit 420 divides the region outside the radius of the DTV service into a plurality of regions having a predetermined interval from a point spaced apart from the predetermined protection spaced distance.

The present invention may employ various algorithms or mechanisms, as well as the aforementioned method.

The level determination unit 430 may determine a priority or a level for each of the plurality of divided regions.

For example, referring to FIG. 3, the region B may use the channel N, but a level thereof for the channel N may be determined as level 3 that is a lower level, the region C may use the channel N, but a level thereof for the channel N may be determined as level 2 that is an intermediate level, and the region D may use the channel N, but a level thereof for the channel N may be determined as level 1 that is a higher level capable of using the level of the channel N without interference.

When the available channel calculation unit 440 receives a request for available channel information from the TVBD, the available channel calculation unit 440 may calculate available channels usable by the TVBD based on one or more predetermined reference parameters. Here, the reference parameter includes the information on the first user, information on a location of the TVBD, the type of the device, a height of the transmission antenna, a protection spaced distance according to the height of the transmission antenna, and the like.

In this case, the type of the device represents a fixed type or a mobile type. The protection spaced distance according to the height of the transmission antenna for protecting the DTV service of the FCC is represented in Table 1 below.

TABLE 1

| Height of TVBD antenna from average terrain elevation | Protection spaced distance (km) | |
|---|---|---|
| | Same channel | Adjacent channel |
| Lower than 3 m | 4.0 | 0.4 |
| 3 m to 10 m | 7.3 | 0.7 |
| 10 m to 30 m | 11.1 | 1.2 |
| 30 m to 50 m | 14.3 | 1.8 |
| 50 m to 75 m | 18.0 | 2.0 |
| 75 m to 100 m | 21.1 | 2.1 |
| 100 m to 150 m | 25.3 | 2.2 |
| 150 m to 200 m | 28.5 | 2.3 |
| 200 m to 250 m | 31.2 | 2.4 |

For example, referring to FIG. 3, the channel N may be calculated as the available channel usable by the TVBD in the region B, the region C, and the region D outside the protection spaced distance in the region outside the radius of the DTV service.

When the available channels are calculated, the priority assignment unit 450 may generate an available channel list including the available channels to which the priorities are assigned, by assigning the priority based on the predetermined level to each of the calculated available channels, and provide the generated available channel list to the corresponding TVBD.

The database 460 may store the reference parameter, an available channel list for each TVBD, and the like.

Figure 5:
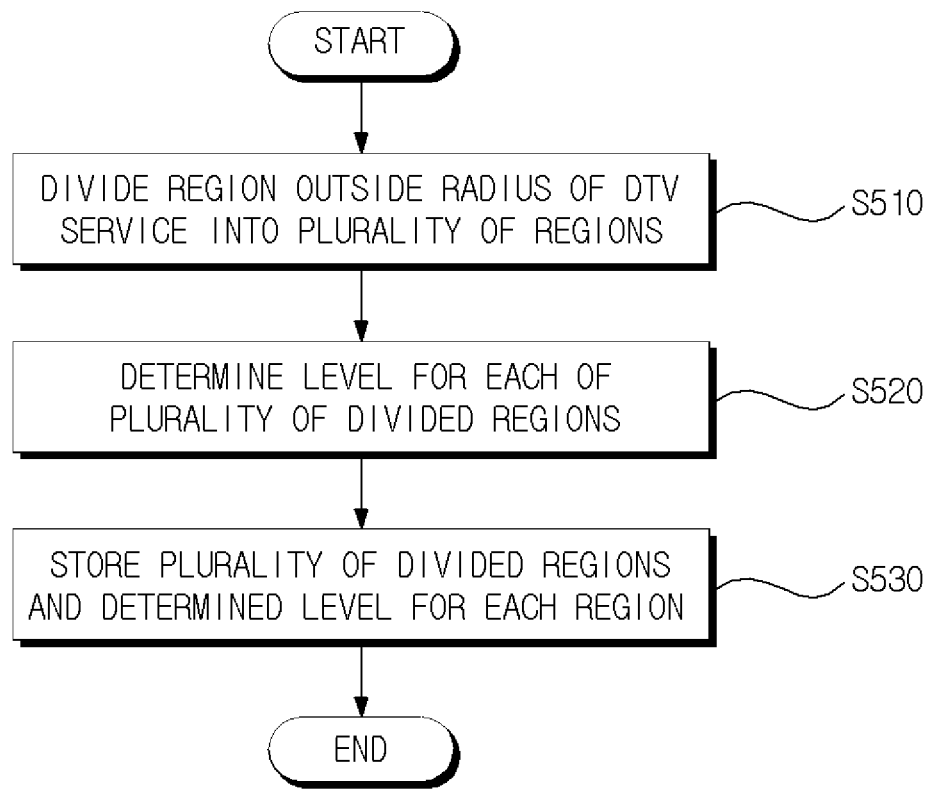
FIG. 5 is a diagram illustrating a method of determining an available channel level according to an exemplary embodiment of the present invention.

FIG. 5 is a diagram illustrating a method of determining an available channel level according to the exemplary embodiment of the present invention.

As illustrated in FIG. 5, an apparatus for calculating available channels (hereinafter, referred to as a calculation apparatus) according to the present invention may divide the region outside the radius of the DTV service for protecting the DTV service into one or more regions or areas based on a DTV transmitter (S510).

In this case, the calculation apparatus divides the region outside the radius of the DTV service into a plurality of regions considering an actual neighboring environment, such as information on a radio wave environment for each region or radio wave signal strength.

Next, the calculation apparatus may determine a priority or a level for each of the plurality of divided regions (S520).

Next, the calculation apparatus may store the plurality of regions divided based on the DTV transmitter, and the priority or the level determined for each of the plurality of divided regions in the database (S530).

Figure 6:
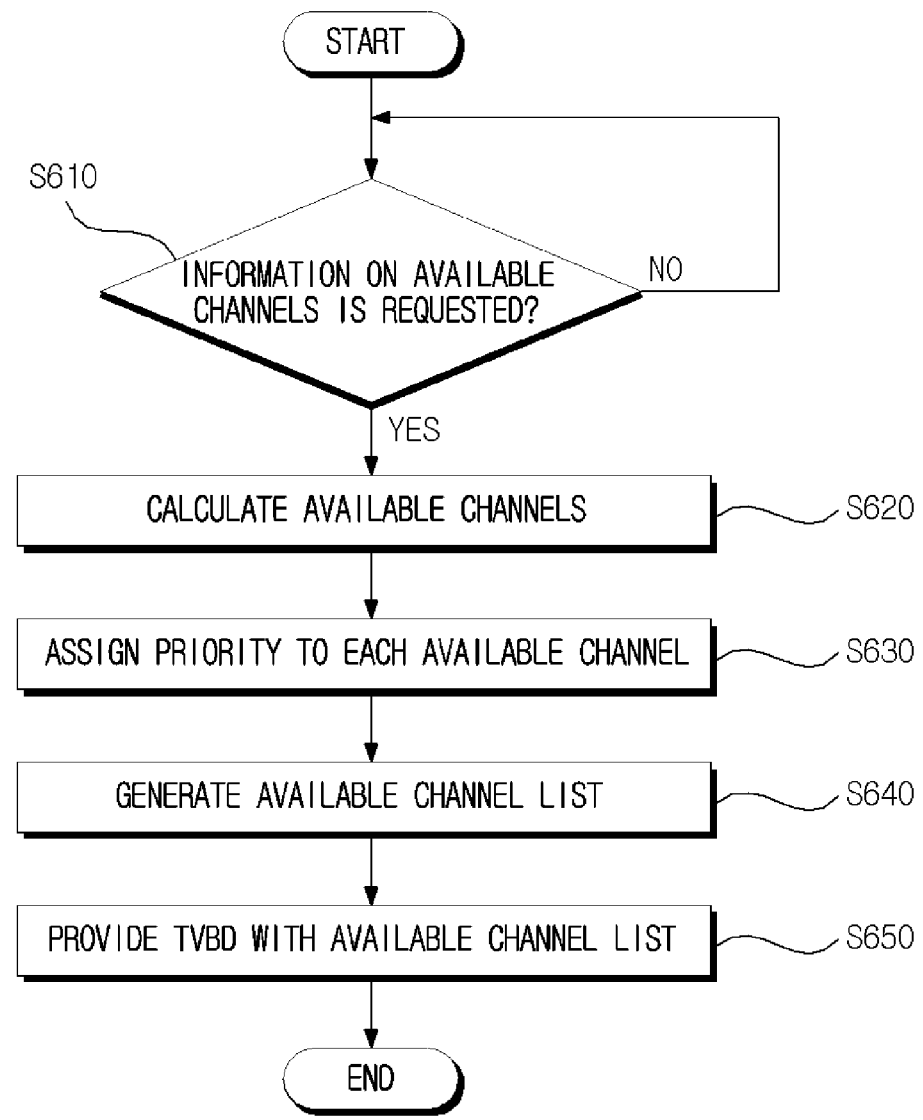
FIG. 6 is a diagram illustrating a method for calculating available channels according to an exemplary embodiment of the present invention.
Figure 7:
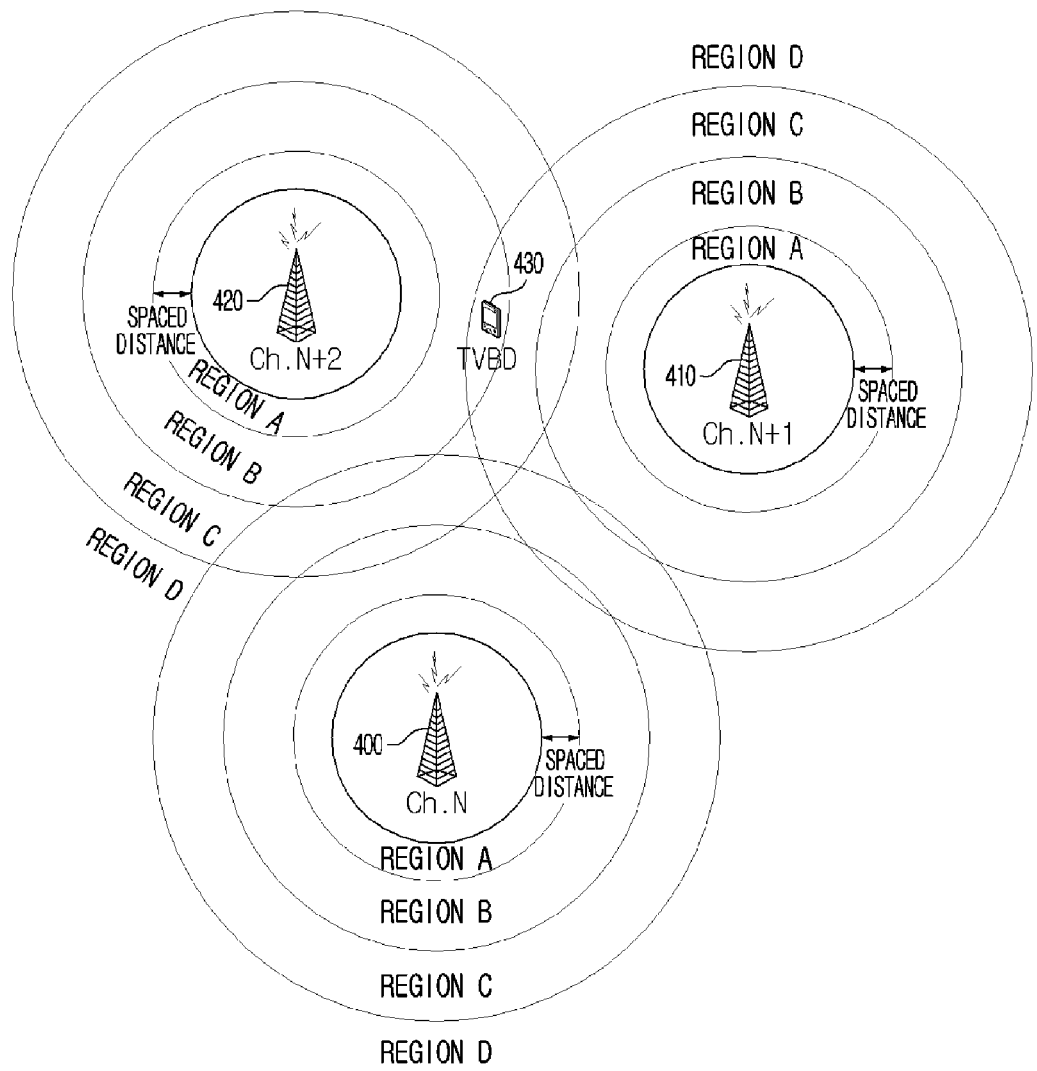
FIG. 7 is a diagram illustrating a principle for calculating available channels according to an exemplary embodiment of the present invention.

FIG. 6 is a diagram illustrating a method for calculating available channels according to the exemplary embodiment of the present invention, and FIG. 7 is a diagram illustrating a principle for calculating available channels according to the exemplary embodiment of the present invention.

Referring to FIGS. 6 and 7, when the apparatus for calculating available channels (hereinafter, referred to as a calculation apparatus) according to the present invention receives a request for information on available channels from the TVBD (S610), the calculation apparatus may calculate available channels usable by the TVBD based on one or more predetermined reference parameters (S620).

For example, when the calculation apparatus receives a request for information on available channels by receiving information, such as information on a location of the TVBD, the type of the device, and information on a height of the transmission antenna from the TVBD desiring to use the TVWS through Wi-Fi or an existing network, the calculation apparatus calculates channels, that is, the available channels, usable at a location which the TVBD desires to operate currently by using information on a first user, the information on the location of the corresponding TVBD, the type of the device, the height of the transmission antenna, and the protection spaced distance according to the height of the TVBD transmission antenna.

Here, the calculation apparatus calculates the channel N, the channel N+1, and the channel N+2 as the available channels.

Next, when the available channels are calculated, the calculation apparatus may assign a priority to each of the calculated available channels based on a predetermined level (S630).

For example, the calculation apparatus assigns a high priority to the channel N, assigns an intermediate priority to the channel N+1, and assigns a low priority to the channel N+2.

Next, the calculation apparatus may generate an available channel list including the available channels to which the priorities are assigned (S640), and may provide the generated available channel list to the corresponding TVBD (S650). For example, the available channel list includes available channel information, priority information, and the like.

Accordingly, when the TVBD receives the available channel list, the TVBD selects an available channel having the highest priority in the received available channel list and uses the selected available channel.

For example, the TVBD first attempts the TVBD service by using the channel N having the highest priority among the three available channels, that is, the channel N, the channel N+1, and the channel N+2. When the TVBD services are not smooth because another neighboring TVBD has already occupied the channel N, the TVBD repeats a process of attempting the TVBD service by using the channel N+1 having the next priority.

In the present invention, it has been assumed that the first user is the DTV service for convenience of the description, but the present invention may be applied to various types of protection services, such as a wireless microphone service, a terrestrial digital multimedia broadcasting (DMB) service, a community access TV service, and the like, by the same method, as well as the DTV service, and the method suggested in the present invention is not limited to the TVWS, and is applicable to all of the bands using a frequency through sharing the frequency.

In the meantime, even if it is described that all of the constituent elements constituting the aforementioned exemplary embodiment of the present invention are coupled as a single unit or coupled to be operated as a single unit, the present invention is not necessarily limited to the exemplary embodiment. That is, among the components, one or more constituent elements may be selectively coupled to be operated within the scope of the object of the present invention. Although each of the constituent elements may be implemented as an independent hardware, some or all of the constituent elements may be selectively combined with each other, so that they can be implemented as a computer program having one or more program modules for executing some or all of the functions combined in one or more hardwares. Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for calculating available channels considering a priority in a TVWS, comprising:
  a communication module configured to receive a request for information on usable available channels from a TV Band Device (TVBD);
  an available channel calculation unit configured to calculate one or more available channels for multiple regions outside a radius of a DTV service usable by the TVBD based on one or more predetermined reference parameters according to the request;
  a priority assignment unit configured to assign a priority to each of the calculated available channels, generate an available channel list including the available channels to which the priorities are assigned, and provide the TVBD with the generated available channel list; and
  a database configured to store the available channels, to which the priorities are assigned, calculated for each TVBD,
  wherein a region outside the radius of the DTV service for protecting the DTV service is divided into a plurality of regions with a predetermined interval, so that the priority is differently determined for the multiple regions that are within the plurality of regions that are divided.

2. The apparatus of claim 1, wherein the reference parameter includes at least one of information on a first user, information on a location of the TVBD, a type of the TVBD, a height of a transmission antenna of the TVBD, and a protection spaced distance according to the height of the transmission antenna of the TVBD.

3. The apparatus of claim 1, wherein the priority assignment unit assigns the priority that is predetermined according to the region in which the TVBD is located to each of the calculated available channels to generate an available channel list including one ore more available channels to which the priorities are assigned, and provides the TVBD requesting the information on the available channels with the generated available channel list.

4. The apparatus of claim 1, further comprising:
  a region dividing unit configured to divide the region outside the radius of the DTV service for protecting the DTV service into the plurality of regions with the predetermined interval; and
  a level determination unit configured to determine the priority for each of the plurality of divided regions.

5. The apparatus of claim 4, wherein the region dividing unit detects strength of a radio wave signal received from the TVBD to predict radio wave path loss to a corresponding region based on the strength of the detected radio wave signal, and divides the region outside the radius of the DTV service for protecting the DTV service into the plurality of regions with the predetermined interval based on the predicted radio wave path loss.

6. The apparatus of claim 5, wherein the region dividing unit divides the region outside the radius of the DTV service for protecting the DTV service into the plurality of regions with the predetermined interval from a point spaced by the protection spaced distance.

7. A method of calculating available channels considering a priority in a TVWS, comprising:
  receiving a request for information on usable available channels from a TV Band Device (TVBD);
  calculating one or more available channels for multiple regions outside a radius of a DTV service usable by the TVBD based on one or more predetermined reference parameters according to the request;
  assigning a priority to each of the calculated available channels, generating an available channel list including the available channels to which the priorities are assigned, and providing the TVBD with the generated available channel list; and
  storing the available channels, to which the priorities are assigned, calculated for each TVBD, wherein a region outside a radius of a DTV service for protecting the DTV service is divided into a plurality of regions with a predetermined interval, and so that the priority is differently determined for the multiple regions that are within plurality of regions that are divided.

8. The method of claim 7, wherein the reference parameter includes at least one of information on a first user, information on a location of the TVBD, a type of the TVBD, a height of a transmission antenna of the TVBD, and a protection spaced distance according to the height of the transmission antenna of the TVBD.

9. The method of claim 7, wherein the providing includes assigning the priority that is predetermined according to the region in which the TVBD is located to each of the calculated available channels to generate an available channel list including one ore more available channels to which the priorities are assigned, and providing the TVBD requesting the information on the available channels with the generated available channel list.

10. The method of claim 7, further comprising:
dividing the region outside the radius of the DTV service for protecting the DTV service into the plurality of regions with the predetermined interval; and
determining the priority for each of the plurality of divided regions.

11. The method of claim 10, wherein the dividing includes detecting strength of a radio wave signal received from the TVBD to predict radio wave path loss to a corresponding region based on the strength of the detected radio wave signal, and dividing the region outside the radius of the DTV service for protecting the DTV service into the plurality of regions with the predetermined interval based on the predicted radio wave path loss.

12. The method of claim 11, wherein the dividing includes dividing the region outside the radius of the DTV service for protecting the DTV service into the plurality of regions with the predetermined interval from a point spaced by the protection spaced distance.

\* \* \* \* \*